United States Patent Office 3,420,130
Patented Jan. 7, 1969

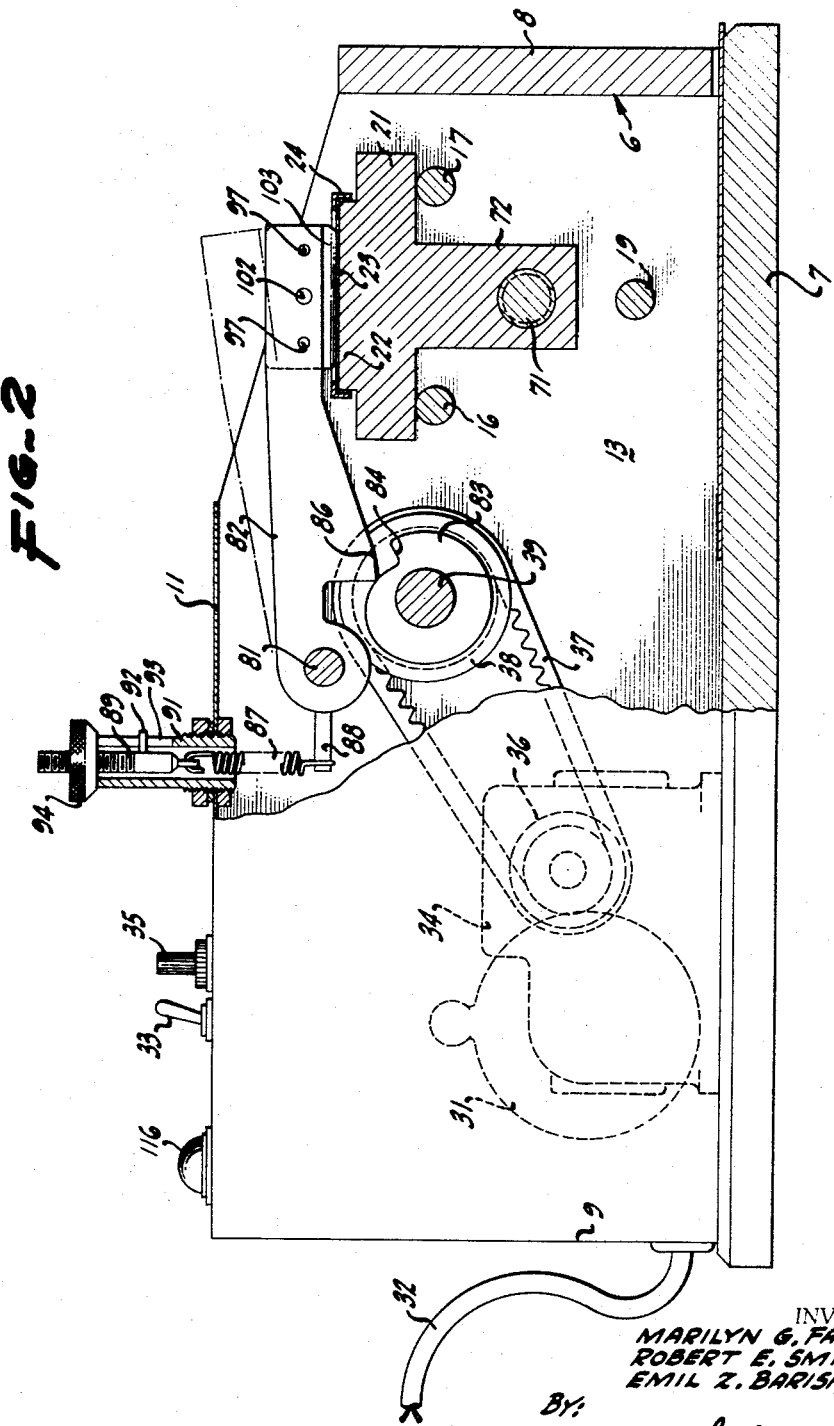

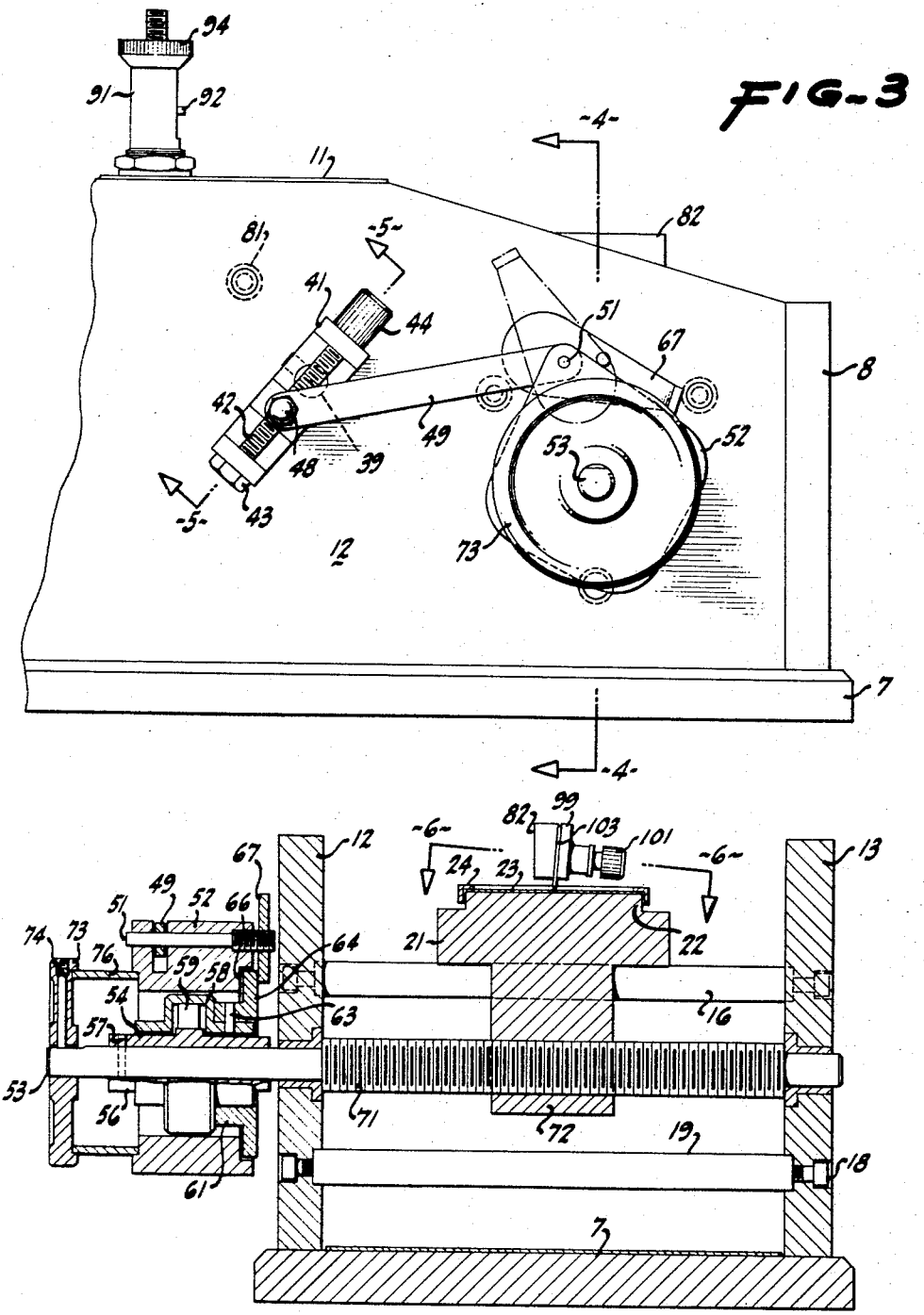

3,420,130
MACHINE FOR THIN SLICING A
NON-FROZEN SPECIMEN
Marilyn G. Farquhar, San Mateo, Robert E. Smith, Mountain View, and Emil Z. Barish, San Francisco, Calif., assignors to The Regents of the University of California, Berkeley, Calif.
Filed Feb. 18, 1966, Ser. No. 528,442
U.S. Cl. 83—245            3 Claims
Int. Cl. B26d 5/20

ABSTRACT OF THE DISCLOSURE

A machine for thin slicing a non-frozen specimen, especially for biological preparation, has a cutting table movable across a frame by a screw shaft. A cam shaft on the frame has a cam for lifting and dropping a lever. A knife on the lever is thus moved toward and away from the table. A variable radius crank on the cam shaft is connected by a pitman to an overrunning or unidirectional clutch on the crew shaft.

---

The invention described herein was made in the performance of work under research grants from the United States Public Health Service.

Our invention relates to the preparation of specimens of material, such as biological tissue, capable of being sectioned into thin slices (say, 10 to 50 microns) primarily for use in various exploratory and investigative techniques, particularly in the preparation of such specimens for observation under microscopes and the like.

In the preparation of many unembedded biological tissues, it is necessary to freeze the bulk material prior to preparation of the thin specimens in order that the speciments can be cut to the desired degree of thinness. With the freezing technique, the tissues are often altered by the freezing step, so that what is ultimately observed is not necessarily a true indication of the starting material. There is consequently a need for producing specimens of considerable thinness so that their examination by various microscopic techniques is facilitated and at the same time to have the specimens as nearly as possible unaffected by the preparation for examination.

The main object of our invention is to provide a machine and method for thin slicing biological tissue in non-frozen condition; i.e., at room temperature.

A further object of the invention is to provide a machine and method for thin slicing material into successive slices of substantially uniform thinness.

Another object of the invention is to provide a machine and method for thin slicing of material which can readily be operated by technicians proficient in the usual techniques and to provide a machine which will operate uniformly and consistently with little or no maintenance or detailed supervision.

Another object of the invention is in general to provide an improved machine and method for thin slicing non-frozen biological tissue.

In the usual instance, we have provided for use in our method a machine substantially as shown in the accompanying drawings.

FIGURE 2 is a side elevation of the machine with a portion broken away to show the interior construction on a longitudinal plane, the view being taken as shown by the lines 2—2 of FIGURE 1.

FIGURE 3 is a detail showing a portion of the drive mechanism of the machine in side elevation.

FIGURE 4 is a cross section, the plane of which is indicated by the line 4—4 of FIGURE 3.

Figure 1:
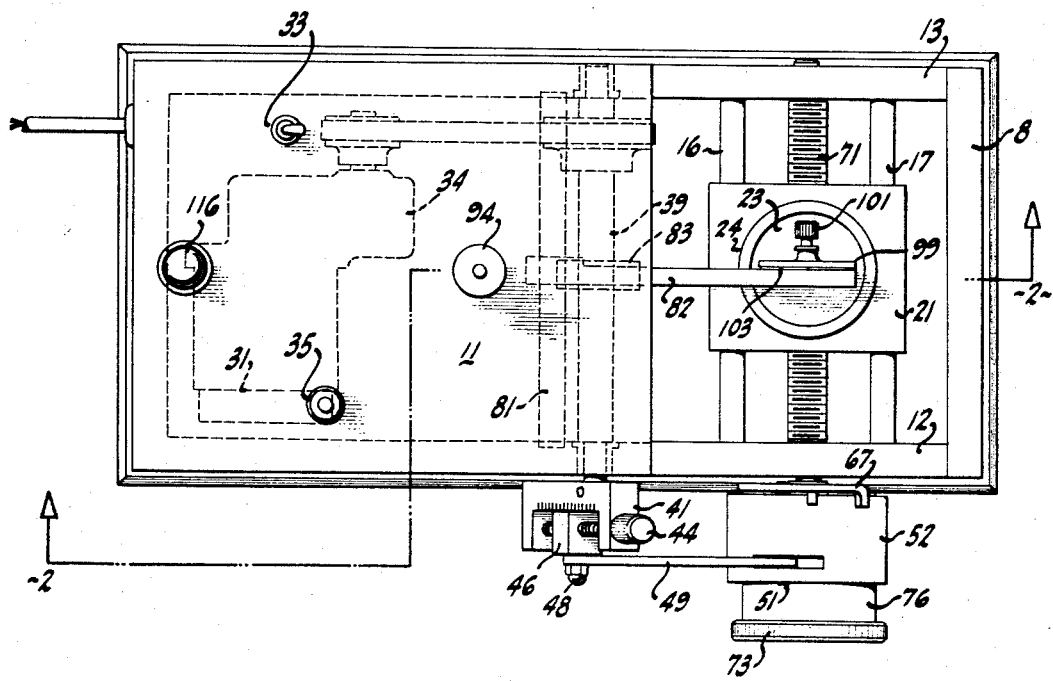
FIGURE 1 shows the machine in plan view.
Figure 5:
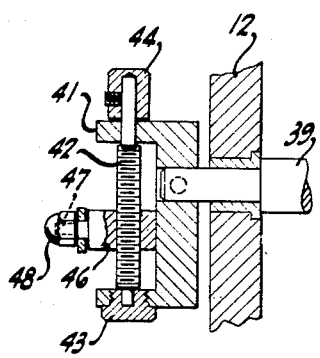
FIGURE 5 is a cross section, the plane of which is indicated by the line 5—5 of FIGURE 3.
Figure 6:
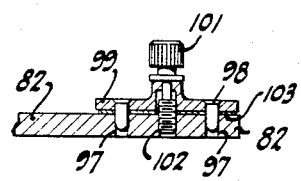
FIGURE 6 is a cross section, the plane of which is indicated by the line 6—6 of FIGURE 4.

In its customary embodiment, the machine utilized in our method includes a frame 6 having a base 7 designed to rest on any appropriate support. The frame includes not only front and rear walls 8 and 9 and a top wall 11, but also side walls 12 and 13. Spanning the space between the side walls 12 and 13 is a pair of circular section support rods 16 and 17 mounted stationarily and held by appropriate fastenings 18 as especially shown in FIGURE 4. Also spanning the space between the side walls 12 and 13 parallel to the rods 16 and 17 is a brace rod 19 provided for additional rigidity.

Designed to rest on and slide freely with respect to the rods 16 and 17 is a carriage or cutting table 21 of considerable mass and stiffness. Rising above the rest of the cutting table 21 is a circular cylindrical disc base 22 on which is placed a relatively yieldable cushion 23 such as a stack of filter papers, a polyethylene pad or filter paper cemented to polyethylene. A friction ring 24 engages the cushion 23 and the sides of the disc 22 and provides a means for holding the cushion in position or for releasing the cushion for replacement.

In accordance with the invention, means are provided for moving the table 21 from side to side within the frame 6. Since this motion is preferably performed by power, there is mounted on the base 7 near the rear thereof an electric motor 31 supplied with electricity through a standard cord 32 under the control of a manual switch 33, the motor speed being regulated by a potentiometer knob 35. The motor drives through a gear reduction mechanism 34 having an output drive pulley 36. A belt 37 in engagement with the drive pulley also engages a driven pulley 38 on one end of a driven cam shaft 39 journalled in the side walls 12 and 13 and projecting from the wall 12.

At its outboard end the shaft 39 carries a yoke 41 in which a shouldered screw shaft 42 is journalled and confined against axial translation. A bearing 43 engages one shaft end and a thumb turn 44 the other end. A threaded block 46 meshes with the screw shaft 42. When the diametrically disposed screw shaft 42 is revolved by the thumb turn 44, the block 46 is traversed from a position coincident with the axis of the shaft 39 into any other position displaced radially from the shaft axis.

The block 46 carries a projecting crank pin 47 finished with a cap nut 48 so that the radius of eccentricity of the crank pin 47 is either zero or any selected amount. A pitman link 49 is journalled on the pin 47 and is likewise journalled on a pin 51 extending through a drive housing 52 enclosing a unidirectional clutch mechanism.

A shaft 53 is journalled in the side walls 12 and 13 parallel to the shaft 39 and on a projecting, outboard end carries the unidirectional clutch mechanism 54. This is a standard commercial item and includes a central sleeve 56 secured to the shaft 53 by a pin 57. Surrounding the sleeve 56 is a casing 58 enclosing a number of jamming rollers 59 or comparable sprag structures. The effect of the mechanism 54 is for the casing 58 when driven in one direction to cause the sleeve 56 to turn simultaneously therewith due to jamming of the sprags 59. When turned in the opposite direction, the casing 58 is released from the sleeve 56 due to the declutching movement of the sprags 59.

The casing 58 in this installation is provided with a collar 61 secured thereto by a pin 63 and having a radial flange 64 extending therefrom and partially lodged in a groove 66 formed in the housing 52. The flange 64 is entirely free of the housing 52 under some circumstances, but can be bound thereto under other circumstances. The pin 51 is threaded into the housing 52 and is firmly seated in place, but a portion of the threaded end of the pin projects and carries a manual lever 67. When the lever 67 is rotated through part of a turn, it likewise moves axially on the threads and then bears against and urges the flange 64 into tight frictional engagement with the casing 52. Thus, when the hand lever 67 is in one position, the casing 52 and the outer housing 58 of the unidirectional clutch are constrained to move together, whereas when the lever 67 is in another position, the outer housing 52 is released from the casing 58 so that they can turn separately from each other.

With the described mechanism, when the crank pin 47 has a substantial radius of rotation, the pitman link 49 is operated to oscillate the housing 52. If the hand lever 67 is in released position, no motion is transmitted farther. If the lever 67 is in the other position gripping the flange 64 tightly, then each oscillation of the housing 52 is imparted to the casing 58. For oscillation in one direction the sprags 59 are coupled to the shaft 53 and produce a corresponding oscillation of the shaft in one direction. Upon retrograde movement of the pitman 49, the sprags 59 release and no motion is imparted to the shaft 53. In this fashion, the shaft is rotated in steps or increments all equal so long as the adjustment of the pin 47 is not changed. By rotating the thumb turn 44, the length of swing of the housing 52 can be varied so that the shaft 53 can be rotated in steps of any desired and selected amount from near zero to maximum.

The step-by-step rotation of the shaft 53 rotates a screw 71 formed on the shaft 53 between the side walls 12 and 13. The table 21 has a depending portion 72 internally threaded to engage the threads on the screw shaft. Thus as the shaft 53 is rotated step by step, the table 21 is correspondingly and cyclically traversed in equivalent increments.

Since the unidirectional clutch mechanism is effective to turn the screw shaft in only one direction and to advance the table in only one direction, means are provided for returning the table by oppositely rotating the screw shaft. This is not done by power. It is done by manual rotation of a hand wheel 73 secured on one end of the shaft 53 by a radial pin 74. A loosely fitting guard sleeve 76 is interposed between the housing 52 and the rim of the wheel 73. Thus it is always possible to traverse the table 21 manually in a retrograde direction since the sprags release and by releasing the lever 67 the table 21 can be manually moved in either direction.

To synchronize the cutting operation with the feeding operation so as to provide uniform cuts, we mount a cross shaft 81 spanning the space between the side walls 12 and 13. A knife lever 82 is mounted on the cross shaft 81 and is freely rotatable about the axis of the shaft 81 at least through a limited arc. On the shaft 39, mechanically coupled to the screw shaft 53 through the manual and sprag clutch mechanisms, there is provided a spiral cam 83 having a gradual rise and an abrupt radial portion 84. The cam 83 is designed to cooperate with a cam follower surface 86 on a portion of the knife lever 82.

The cam follower is held in close relationship with the camming surface of the cam not only by the unbalanced weight of the knife lever 82, but also by means of a spring 87 at one end engaging a pin 88 projecting from the knife lever 82 and at the other end hooked into an adjusting screw 89 disposed in a sleeve 91 projecting above the top plate 11 of the frame. The screw 89 is prevented from rotating by a radial pin 92 sliding in a slot 93 in the sleeve 91 and is axially positioned by a thumb nut 94 resting on the sleeve and engaging the screw. By suitably rotating the thumb nut 94, the tension of the spring 87 and the force exerted by the cam follower 86 on the cam surface may be varied.

At its outboard forward end, the knife lever 82 is provided with a pair of apertures 97 to receive pins 98 projecting from a backing plate 99. A thumb screw 101 is mounted in the backing plate and is threaded to engage an appropriately threaded hole 102 in the knife lever. Interposed between the backing plate and the knife lever is a cutting blade 103 having suitable apertures to receive the pins 98 and the screw 101. The knife customarily is a standard form of double-edge razor blade. The inclination of the knife lever and of the backing plate 99 at least in their outboard portions is at an angle to the general plane of the cutting table as shown particularly in FIGURE 4 so that the angled edge of the knife blade does not distort the tissue and is made to traverse the tissue at an angle to the direction of descent to assist in cutting the thin slice desired.

With this mechanism a specimen block of material such as biological tissue at room temperature is disposed on the cushion 23 with the leading edge of the block away from the path of the knife since the carriage 21 is fully retracted or toward the left in FIGURE 4. The tissue block has been previously coated with agar or paraffin which encases the tissue and partly penetrates the underlying filter paper before it hardens. When the motor 31 is energized by operation of the switch 33, the motor starts and an indicator light 116 indicates the closure of the circuit. As the motor revolves and as the screw shaft 53 revolves to advance the carriage 21, the cam shaft 39 rotates in time therewith and the knife lever 82 cyclically oscillates in an arc since the cam follower 86 follows the cam surface under the influence of the weight of the knife lever and also under the influence of the tension of the spring 87. The knife repeatedly descends in the path of the advancing specimen block during the time the block is stationary between steps of advancement. When the block has advanced into position, the knife for each cycle severs a thin specimen from the specimen block and deposits it on the cushion 23. The cushion reduces vibration, permits the stroke of the knife to be sufficient so as entirely to sever the tissue, but protects and shields the edge of the knife blade and prevents it from becoming dulled. Furthermore, the slight yielding of the cushion permits the specimen block to yield slightly and this tends to insure a more nearly uniform and even cutting of the knife blade. The carriage 21 traverses until a sufficient number of specimen slices have been formed or until the specimen block has been entirely divided. Following that, the switch 33 is reversed and the motor 31 is stopped. With the knife blade in a raised position, the hand wheel 73 is rotated manually so as to restore the carriage to its initial position at the left hand as seen in FIGURE 4. The ring 24 is detached and the prepared specimens with the cushion 23 are removed and a similar, successive cushion is installed ready for the next operation.

What is claimed is:

1. A machine for thin slicing a non-frozen specimen comprising a frame, a cutting table, means on said frame for supporting said cutting table and for advancing said cutting table relative to said frame, said advancing means including a screw shaft journalled in said frame and engaging said cutting table and also including a variable radius crank connected to said screw shaft by an overrunning clutch and a pitman, a knife lever, means on said frame for pivotally supporting said knife lever for cyclic movement toward and away from said advancing table, means on said frame for so moving said knife lever, and means for interconnecting said moving means and said advancing means for operation together.

2. A machine as in claim 1 in which said lever moving means includes a cam shaft journalled in said frame and a cam on said cam shaft engageable with said lever, said overrunning clutch is on said screw shaft, and said variable radius crank is on said cam shaft.

3. A machine as in claim 1 in which a hand wheel is secured on said screw shaft, and said overrunning clutch drives said screw shaft in one direction.

(References on following page)

References Cited

UNITED STATES PATENTS

| | | | |
|---|---|---|---|
| 243,068 | 6/1881 | Hake | 83—277 X |
| 1,233,360 | 7/1917 | Hosey et al. | 146—144 X |
| 1,780,680 | 11/1930 | Kay | 31—20 |
| 1,963,768 | 6/1934 | West | 83—414 X |
| 3,108,349 | 10/1963 | Takacs | 25—113 X |
| 3,227,024 | 1/1966 | Kress | 83—658 X |

JAMES M. MEISTER, *Primary Examiner.*

U.S. Cl. X.R.

83—266, 276, 414, 915.5